United States Patent
Sharma et al.

(10) Patent No.: US 6,950,919 B2
(45) Date of Patent: Sep. 27, 2005

(54) COMPUTER SYSTEM WITH OPERATING SYSTEM TO DYNAMICALLY ADJUST THE MAIN MEMORY

(75) Inventors: Manish Sharma, Mountain View, CA (US); Janice H. Nickel, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 10/397,434

(22) Filed: Mar. 26, 2003

(65) Prior Publication Data
US 2004/0193783 A1 Sep. 30, 2004

(51) Int. Cl.[7] .............................................. G06F 12/00
(52) U.S. Cl. ......................... 711/170; 711/114; 714/7; 710/302
(58) Field of Search ........................... 711/2, 5–6, 104, 711/114, 115, 170, 171–173, 203; 710/2–3, 8–10, 13, 300–304; 714/7

(56) References Cited

U.S. PATENT DOCUMENTS

| | | |
|---|---|---|
| 5,732,238 A | 3/1998 | Sarkozy |
| 5,787,466 A | 7/1998 | Berliner |
| 5,860,083 A | 1/1999 | Sukegawa |
| 6,243,345 B1 | 6/2001 | Kwang |
| 6,404,674 B1 | 6/2002 | Anthony et al. |
| 6,504,221 B1 | 1/2003 | Tran et al. |
| 6,507,883 B1 | 1/2003 | Bello et al. |
| 2002/0176272 A1 | 11/2002 | Vinyard et al. |
| 2003/0005219 A1 | 1/2003 | Royer, Jr. et al. |

*Primary Examiner*—Nasser Moazzami

(57) ABSTRACT

This disclosure provides a computer system with operating system permitting dynamic reallocation of main memory during operation. In a particular embodiment the computer system with operating system are used in connection with non-volatile main memory stores (NMS) such as MRAM. As the NMS is a component of main memory attached directly to the memory bus, the NMS functions at substantially the same speed as traditional volatile memory stores. Reallocation of main memory and use of applications or programs stored on the inserted NMS occurs at speeds orders of magnitude greater than traditional secondary memory devices.

41 Claims, 4 Drawing Sheets

COMPUTER SYSTEM WITH OPERATING SYSTEM TO DYNAMICALLY ADJUST THE MAIN MEMORY

FIELD OF THE INVENTION

This invention relates generally to operating systems for computer systems with memory, in particular to computer systems with operating systems dynamically adjusting use of main memory as non-volatile main memory modules are inserted or removed during operation of the computer system.

BACKGROUND OF THE INVENTION

Today's computer systems are becoming increasingly sophisticated, permitting users to perform an ever increasing variety of computing tasks at faster and faster rates.

Regardless of the speed of the processor, the storage capacity of the hard drive, the available main memory, and the dazzling features of other hardware, these components are mere paperweights until power is applied and an operating system is loaded to enable use of the system.

At the simplest level, and in the most general sense, the tasks of an operating system fall into specific categories—Process Management, Device Management (including application and user interface management) and Memory Management (including storage).

Memory for a computer system is technically any form of electronic, magnetic or optical storage; however it is generally divided up into different categories based in part upon speed and functionality. Mass storage devices are typically permanent non-volatile memory stores which are generally understood to be cheap, slow, and large capacity devices such as hard drives, tape drives, optical media, and other mass storage devices. The primary object of mass storage devices is to store an application or data until it is required for execution. With low cost and a non-volatile nature, mass storage devices typically provide a computer system with memory stores ranging to the hundreds of gigabytes. These mass storage devices operate with access times generally in excess of 1 millisecond. If the processor had to access such a mass storage device for each and every piece of data needed, the computer system would operate very slowly.

To facilitate quick access for processing, a typical modern computer has a main memory connected by a memory bus directly to the processor. In contrast to the relatively slow storage memory, the main memory is generally comprised of fast, expensive volatile random access memory (RAM), such as DRAM, SDRAM or RDRAM, with access times generally less than 100 nanoseconds. Due to high cost and the volatile nature requiring continuous power, main memory RAM is typically provided in a size range from a few 10's of megabytes to one or two gigabytes. Very fast (frequently less than 10 nanoseconds) and more expensive SRAM is typically used as a small amount of cache memory sitting between the processor and main memory. The size of such fast caches is typically a few 10's of kilobytes to a few megabytes. In more sophisticated systems, several levels of cache memory may be used, each level being of different speed and size.

To be usable by the processor the main memory must be organized. During initialization the operating system will divide the available main memory as reported by the BIOS into standard block sizes, such as for example 2 kilobytes. The applications to be run are then loaded into these fixed block sizes. Traditionally, only the portion of the application required for an immediate operation is loaded into main memory at any given time. As different portions of the application are required for processing, the portion of the active code in the main memory blocks is replaced. The larger the main memory the greater the amount of processing code that may be resident in memory at any one time.

Cycling code in and out of main memory as required by the available space in main memory is a time consuming process and directly affects system performance. However, in general, the processor can only access memory one location at a time, so the vast majority of main memory RAM is unused at any given moment.

As a computer system may be used in a variety of ways the amount of RAM deemed appropriate in one instance may be insufficient or superfluous in another. For example, an image processing and manipulation application may not only be time consuming to initialize for use, but also may require the majority of available main memory RAM resources, while a simple text editor may hardly be noticeable to the system.

RAM is expensive. While a user may indeed power down a computer system and change the size of the RAM to reflect expected needs, it is time consuming and may require special tools and knowledge as well as investment in additional RAM.

To assist with this dilemma, computer systems commonly employ the use of virtual memory—specifically, the operating system designates a portion of the hard drive to act as additional RAM. While this is helpful and cost effective, the slow nature of the hard drive degrades overall system performance and makes this a less than effective solution in many situations.

One feature of virtual memory, and operating systems that support its use, is that virtual memory may be dynamically adjusted during system operation. Commonly, this is a task that is even automated by the operating system in response to the system user initiating multiple memory-intensive applications at the same time. De-allocation may also be performed though it is typically a more involved process.

Beneficial as this process and ability is, the typical speed of a hard drive being approximately 7 milliseconds is thousands of orders of magnitude greater than the typical speed of main memory RAM. Thus, during the allocation or de-allocation process the user must endure a significant pause in the use of the computer system.

Many modern operating systems permit Plug-and-Play devices which are recognized at boot up and automatically configured, and hot-pluggable devices which may be added or removed from the computer system while it is operating.

In some instances the Plug-and-Play or hot-plugged devices may be memory devices such as FLASH cards which may be used as an improvement over the virtual memory provided by a hard drive. However, such devices are still orders of magnitude slower than main memory RAM and thus can not be used to seamlessly augment the size and capability of main memory.

Additionally, main memory is arranged and subdivided by the operating system during the initial load of the operating system. While main memory RAM may be increased or decreased when the system is powered down, current operating systems do not permit main memory RAM to be added or removed during system operation. Doing so inflicts great instability to the operating system and computer system as a whole. Current operating systems do not permit dynamic reallocation of main memory while the system is running.

Further, even if the main memory RAM were removed without critically disabling the computer system, the volatile nature of commonly used RAM dictates that what was held in the RAM prior to removal would be lost immediately upon removal. Thus any desire to share applications between computer systems or store for immediate use at a later date must be made through the use of slow non-volatile memory technologies.

Hence, there is a need for a computer system and operating system which overcomes one or more of the drawbacks identified above. The present invention satisfies one or more of these needs.

SUMMARY OF THE INVENTION

The invention provides a computer system with operating system for dynamically adjusting use of main memory as non-volatile main memory modules are inserted or removed during operation of the computer system.

In particular, and by way of example only, according to an embodiment of the present invention, this invention provides a computer system including: a main board; at least one central processing unit (CPU) coupled to the main board; a main memory, coupled to at least one CPU by the main board, the main memory capable of receiving at least two memory stores including: a first memory store; and a removable non-volatile memory store (NMS), the NMS operating with the at least one CPU at substantially the same speed as the first memory store; the main memory further capable of supporting an operating system loaded into the main memory upon power up of the computer system, the operating system controlling the primary operation of the at least one CPU and main memory, the operating system permitting dynamic adjustment of main memory in response to the removal or insertion of the NMS; at least one input device, coupled to the CPU; and at least one output device, coupled to the CPU.

Moreover, according to an embodiment thereof, the invention may provide a computer system including: a main board; at least one CPU coupled to the main board; a main memory, coupled to the at least one CPU by the main board, including: a first memory store; a NMS, the NMS operating with the CPU at substantially the same speed as the first memory store; and an operating system loaded into the first memory store upon power up of the computer system, the operating system controlling the primary operation of the at least one CPU and main memory, the operating system permitting dynamic adjustment of main memory in response to a notification regarding the removal or insertion of the NMS; at least one input device, coupled to the CPU; and at least one output device, coupled to the CPU.

In yet another embodiment, the invention may provide an operating system, executable by a computer having a CPU and memory, including: a process manager for managing access time to the CPU for an active process; a memory manager for managing memory comprising cache, main memory and virtual memory, for the execution of a currently active process by the CPU; a device manager for managing the input and output of information required by a process as executed by the CPU; and a main memory controller coupled to the memory manager, for dynamically adjusting use of main memory as non-volatile main memory is added or removed from the computer system during operation.

These and other features and advantages of the preferred apparatus and method will become apparent from the following detailed description taken in conjunction with the accompanying drawings which illustrate, by way of example the principles of the invention.

DETAILED DESCRIPTION

Before proceeding with the detailed description, it is to be appreciated that the present invention is not limited to use or application in conjunction with a specific type of computer system, operating system or non-volatile main memory. Thus, although the present invention is, for the convenience of explanation, depicted and described with respect to typical exemplary embodiments, it will be appreciated that this invention may be applied with other types of computer systems, operating system and non-volatile main memory.

Magnetic random access memory (MRAM) technology, or Ferroelectric random access memory (FeRAM), has advanced to the point that MRAM chips may now operate at speeds of less than 10 nanoseconds. Such speeds are comparable and compatible with traditional RAM, such as for example DRAM and SRAM.

Unlike traditional RAM, MRAM is purposefully designed to be non-volatile. More specifically, MRAM is capable of holding information that has been provided to it by a computer system, regardless of whether system power is on or off. It is also to be appreciated that this characteristic permits MRAM to store information indefinitely.

MRAM memory stores may be fabricated by those skilled in the art to be substantially the same speed and with substantially the same socket connection as used for more traditional RAM memory stores, for use in a traditional computer. Full use and enjoyment of the properties and special characteristics of MRAM may be realized by the embodiments of the present invention set forth below.

Figure 1:
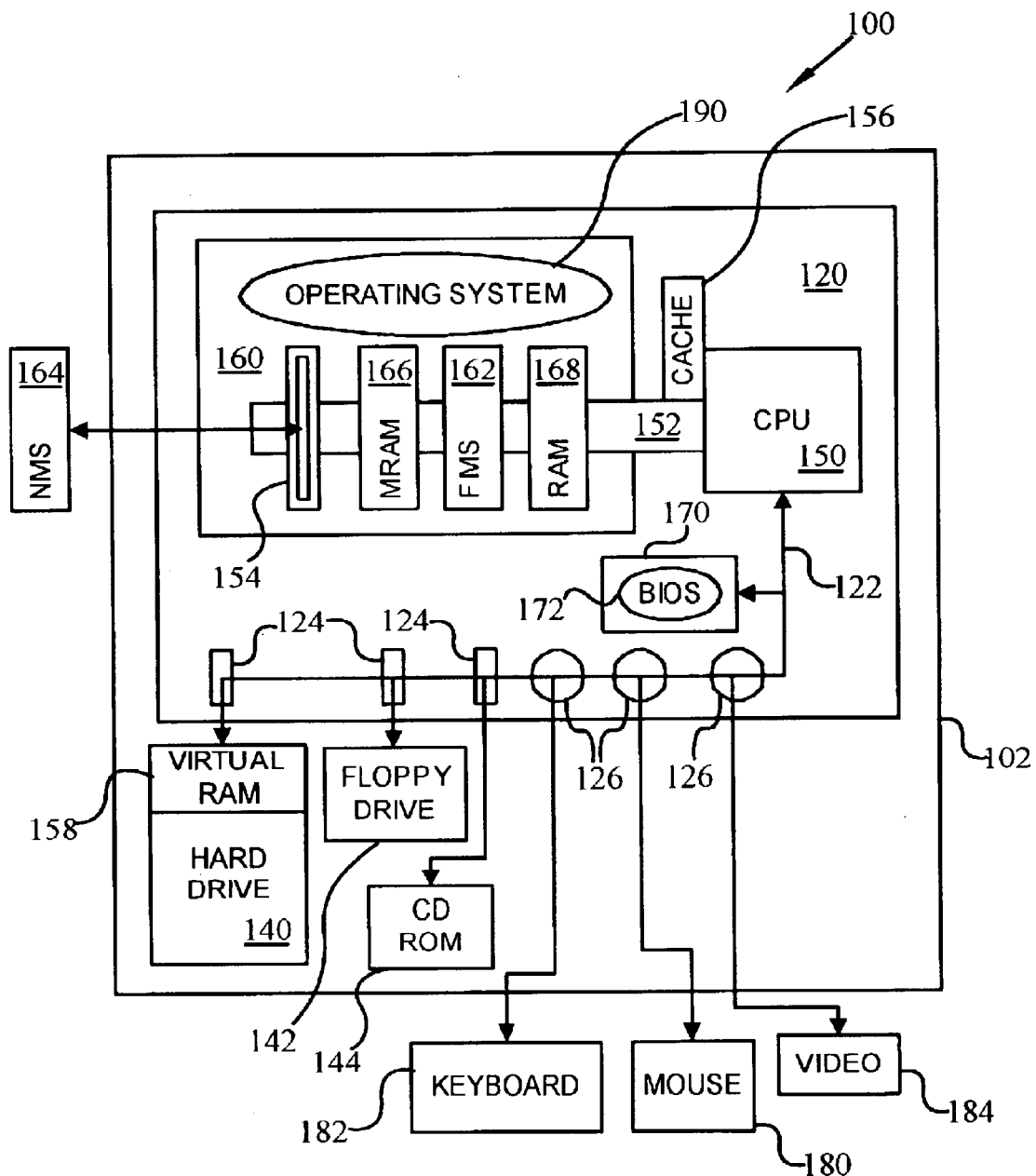
FIG. 1 is a schematic block diagram of a computer system according to an embodiment of the present invention.

FIG. 1 shows a block diagram of an exemplary computer system 100 according to an embodiment of the present invention. The computer system 100 has a case 102 enclosing a main board 120 and a mass storage device such as hard drive 140. The main board has a system bus 122, expansion slots 124, connection ports 126, CPU 150, memory bus 152, memory bus interface 154, cache 156, main memory 160, and a BIOS chip 170 containing BIOS 172. Under appropriate circumstances, computer system 100 may have redundant components such as, for example, additional hard drives, and/or additional CPUs for co-processing.

As shown, main memory 160 may be subdivided as a first memory store (FMS) 162, and a removable non-volatile memory store (NMS) 164, each of which may be connected to the memory bus 152 by a memory bus interface 154. Devices such as mouse 180, keyboard 182, video display 184, hard drive 140, floppy drive 142 and CD Rom drive 144 may be coupled to main board 120, and more specifically system bus 122, by connection ports 126 and expansion slots 124. Serving as access points to the system bus 122, connection ports 126 and expansion slots 124 effectively couple devices to the CPU 150, to provide input and output to and from the computer system 100.

In at least one embodiment, NMS 164 memory may be MRAM 166 and or FeRAM. It is understood and appreciated that FMS 162 stores may be RAM 168, and more specifically, any variation of traditional RAM as used in computer memory, for example SRAM, DRAM, SDRAM, RDRAM, or other. In addition, under appropriate circumstances FMS may be non-traditional RAM, such as for example MRAM or FeRAM. In at least one As shown, main board 120 may be a unitary structure. Under appropriate circumstances such as for example to maximize use of limited space, main memory 160, BIOS chip 170, connection ports 126, expansion slots 124, cache 156, CPU 150, and other main board 120 components may by coupled separately, or in sub-groups, to independent structures. The buses interconnecting these independent structures may be in the form of cables, such as ribbon cables, or other data path devices. In such a configuration, the primary independent structure, such as that which supports the CPU 150 and or main memory 160, may be identified as the main board. However for purposes of this discussion the aggregation of interconnected independent structures may be appreciated to function in substantially the same fashion as unitary structure main board 120.

Memory bus 152 and system bus 122 are generally understood and appreciated to be the data path and physical interface provided on the main board 120 that interconnects the CPU 150 and all devices attached to the main board. The size of the bus, commonly referred to as width, determines how much data can be transmitted at any one time, while the clock speed determines how fast the data may be transferred. More specifically, the wider and faster the bus, the more data may be transferred. Generally the memory bus 152 is orders of magnitude faster and wider than the system bus 122.

Memory bus 152 is depicted as a wide rectangle coupling FMS 162 and NMS 164 to CPU 150. In contrast, the system bus 122 coupling the hardware subsystems to CPU 156 is depicted as a narrow arrow to illustrate the relative difference in speed and capacity between the two busses. Cache 156 may be coupled directly to CPU 150 and to memory bus 152.

Under appropriate circumstances, such as the use of multiple buses, for example PCI, ISA, AGP, or other, the computer system 100 may include bus masters to help control the flow of information from one bus to another.

It is to be understood and appreciated that because FMS 162 and NMS 164 together comprise main memory 160 and communicate with CPU 150 via the same memory bus 152, NMS 164 operates at substantially the same speed as FMS 162.

When power is applied to boot the computer system, a tiny piece of software known as basic-input-output-systems (BIOS) 172 is loaded to initialize the computer system 100. Responsible for many tasks, the BIOS typically checks the CMOS for custom settings, loads interrupt handlers, performs the power-on-self-test (POST) to check the CPU 150 and main memory 160, and initiates the bootstrap sequence to load the operating system 190 from a bootable storage device, such as a hard drive 140, into main memory 160.

Generally, Plug-and-Play and hot-pluggable devices such as PCMCIA, USB, Firewire, and other such devices which may be connected or removed from the system without rebooting are recognized by the BIOS 172. The recognition may occur during system boot, or in response to a hardware interrupt (IRQ) or other signal generated by the hardware subsystem when the device is attached or removed. In either case, the device is recognized by and notated by the BIOS 172. Such a BIOS notation or flag may then be recognized by the operating system 190. Under appropriate circumstances the IRQ or other signal may be recognized and responded to directly by the operating system.

In at least one embodiment, the BIOS 172 may be Plug-and-Play BIOS, permitting it to recognize and initialize system devices without additional user configuration. Moreover, in at least one embodiment, BIOS 172 has been enabled to register with a flag 276 the presence or absence of NMS 164, see FIG. 2. More specifically, akin to the ability for BIOS 172 to recognize and register the presence or absence of a PCMCIA, USB, Firewire, or other such device, BIOS 172 can recognize and register the presence or absence of NMS 164.

It is understood and appreciated that following the initialization sequence, traditional memory stores such as FMS 162 respond with control signals, such as Memory Ready signals, informing the computer system that the FMS 162 has been properly initialized. To conform to current practices and the well understood architectures of computer hardware subsystems, NMS 164 may also provide control signals, such as Memory Ready signals. Such control signals from NMS 164 may be utilized by BIOS 172 in recognizing and registering the presence of NMS 164, and under appropriate circumstances the size of NMS 164.

Figure 2:
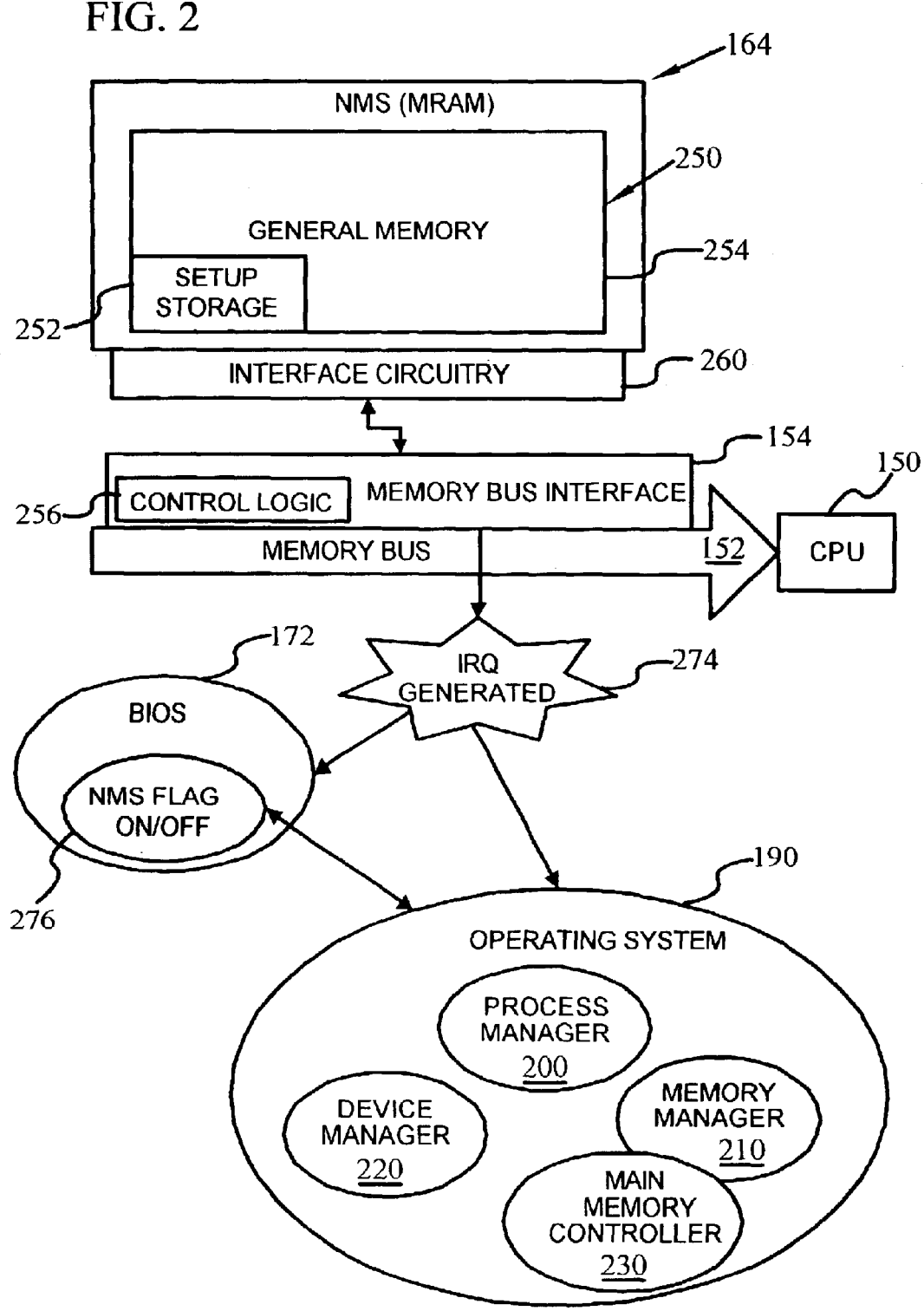
FIG. 2 is a schematic diagram of a non-volatile memory store according to an embodiment of the present invention.

FIG. 2 illustrates a schematic block diagram of NMS 164. As shown, NMS 164 may include sense amplifiers on the memory cells 250 that perform the voltage sensing operations necessary to determine the nature of the binary data values, 1 or 0, stored in NMS 164. When power is applied to NMS 164, it must perform a setup and calibration step to calibrate the voltage sensing levels of the sense amplifiers. To reduce the setup process, the range and calibration values maybe stored in a portion of the NMS 164 memory cells 250 allocated for setup storage 252. The non-volatile nature of NMS 164 insures that these values will be available for later power up cycles and to improve or reduce the calibration time. The remaining memory cells may be used for general memory 254, incorporated into main memory 160.

NMS 164 may also include interface circuitry 260 which couples to the memory bus interface 154 and control logic 256 and circuitry of the main memory 160. The interface circuitry 260 permits NMS 164 to perform a power sense operation to determine when power is provided to NMS 164 from the control logic 256 of main board 120, for example when NMS 164 is inserted into a running computer system 100, or when power is applied to the computer system 100 overall. Further, interface circuitry 260 performs setup and calibration based upon stored values held in setup storage 252. As the setup and calibration is completed in accordance with the traditional handshaking protocols, NMS 164 provides its memory ready signal.

With respect to memory chips, there is a latent period, called latency, between when a memory address is requested and the contents delivered. A similar latent period exists when data is provided for storage. As NMS 164 is understood to operate with CPU 150 at substantially the same speed as FMS 162, the latency related to storage and access is substantially the same for NMS 164 and FMS 162.

The ability to hot-plug NMS 164 into computer system 100 does not imply that the NMS 164 is instantly available for use. Latency with respect to the present invention is defined as the time taken for the NMS 164 to be plugged into the memory bus 152, setup, calibrated, and otherwise made ready for use.

As described above, the boot process for a computer is a complex and time consuming operation, potentially made even more so by complex and specialized interface components which may be required. A beneficial aspect to the use of NMS 164 is that once the operating system 190 has been loaded, if it is loaded entirely to NMS 164, the power to the system may be removed. Upon reconnection, NMS 164 will provide the operating system 190 to the computer system 100 in a state and condition as if there had been no interruption in power, a desirable ability for laptops, PDA, and other devices which may be used away from continuous power supplies. In at least one embodiment NMS 164 is used to preserve battery power, or other remote power supply, when computer system 100 is not in current use.

Regardless of the flavor of the operating system, for example Windows, Macintosh, Unix or other, those skilled in the art will appreciate the fundamental components of an operating system to be process management, device management (including application and user interface), and memory management (including storage management).

According to at least one embodiment of the present invention, the operating system 190 is understood and appreciated to have a process manager 200, a memory manager 210, a device manager 220, and a main memory controller 230.

The process manager 200 is tasked with managing access time to CPU 150 for an active process. More specifically, the process manager 200 is focused upon two tasks. The first is to ensure that each process has enough access time to the CPU 150 to function properly. The second is to insure that as much real work as possible is performed for each CPU cycle. Depending on the flavor of the operating system 190, the component of an executable application being operated upon by CPU 150 may be termed as a process or a thread. For the sake of discussion purposes herein, the term "process" shall be used.

The memory manager 210 is tasked with managing the computer system 100 memory, comprised in general of a cache 156, main memory 160 and under appropriate circumstances virtual memory 158. More specifically, the memory manager 210 is responsible for initializing the configuration of the main memory 160 into memory blocks, acquiring and configuring space on hard drive 140 to act as virtual memory 158 and optimizing the cache 156. With respect to cost per unit of memory, main memory 160 is orders of magnitude more expensive then hard drive 140. As discussed above, virtual memory may be used to supplement the ever changing resource requirements placed on main memory 150.

During system operation, memory manager 210 is responsible for managing memory allocations to running applications between main memory 160, cache 156 and virtual memory 158 as required for processing by CPU 150. To control and manage what is placed where, memory addressing may be employed.

Moreover, memory manager 210 is focused upon ensuring that each process has enough memory in which to execute without running in the memory block allotted for another process or being run accidentally by another process.

The device manager 220 is tasked with managing the input and output of information required by an active process as executed by CPU 150, for example the input of a keystroke on keyboard 182 or the display of a value upon the video display 184.

Device manager 220 may accomplish this task through the use of drivers, understood and appreciated to be special programs that act as translators between the electrical signals of the hardware subsystem and the operating system.

The device manager 220 may also be tasked with application interface. Akin to the use of drivers, application program interfaces (APIS) may be used to standardize the interface between operating system 190 and applications written for program execution by operating system 190.

The presence of main memory controller 230 is significant. Main memory controller 230 enables users of computer system 100 running operating system 190 to dynamically adjust use of main memory 160 without requiring a system shutdown and reboot. More specifically, main memory controller 230 dynamically adjusts use of main memory 160 to permit the insertion or removal of NMS 164 without destabilizing the operation of computer system 100.

Having described the structural embodiments of a computer system 100 with operating system 190 permitting dynamic reallocation of main memory 160 during live operation, the behavior of computer system 100 will now be described with reference to FIG. 2 and flow diagrams FIG. 3 and 4. It will be appreciated that the described events and method of operation need not be performed in the order in which it is herein described, but that this description is merely exemplary of one method of operation in accordance with the present invention.

Figure 3:
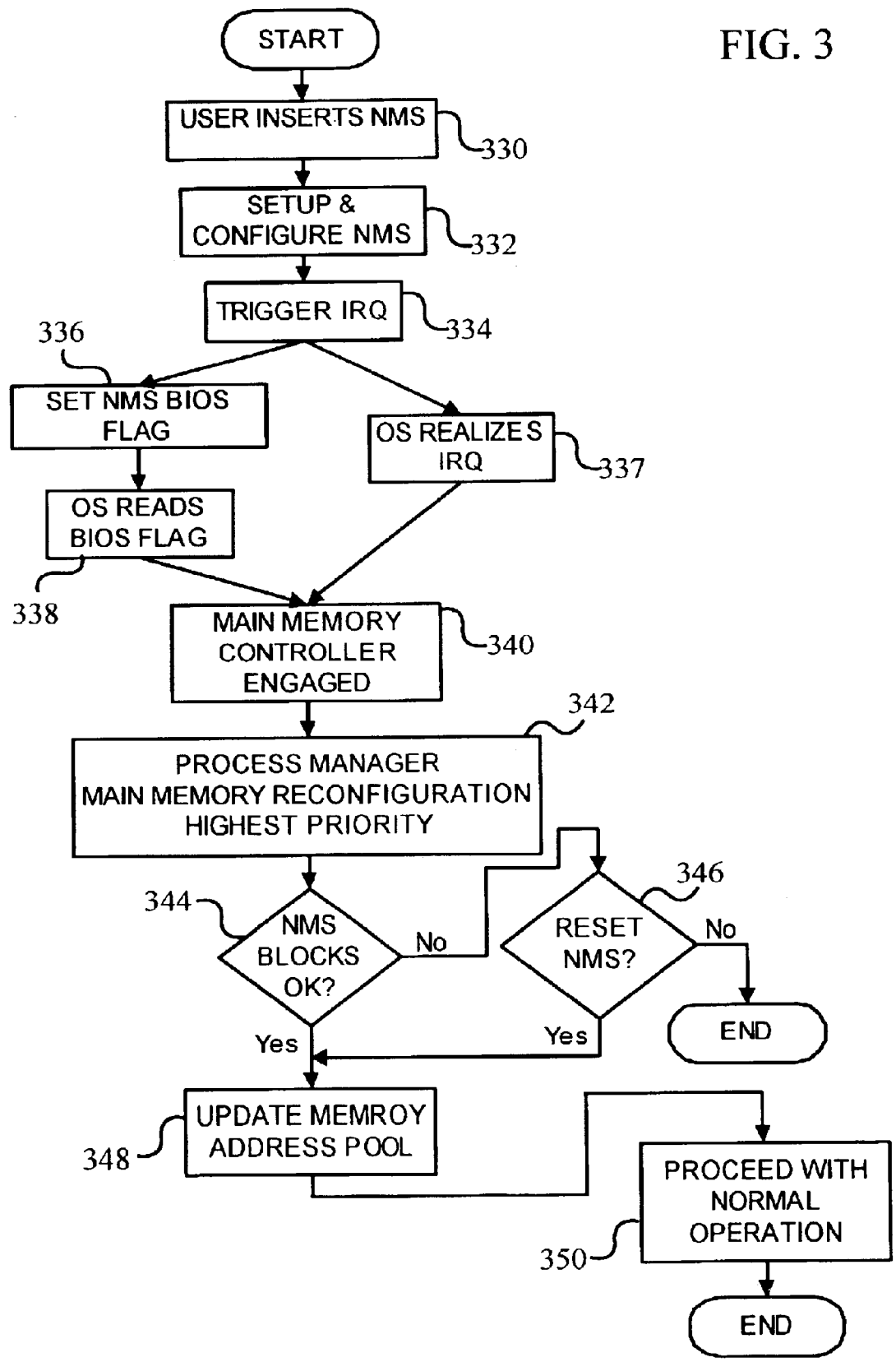
FIG. 3 is a flow diagram illustrating the addition of a non-volatile memory store to main memory according to an embodiment of the present invention.
Figure 4:
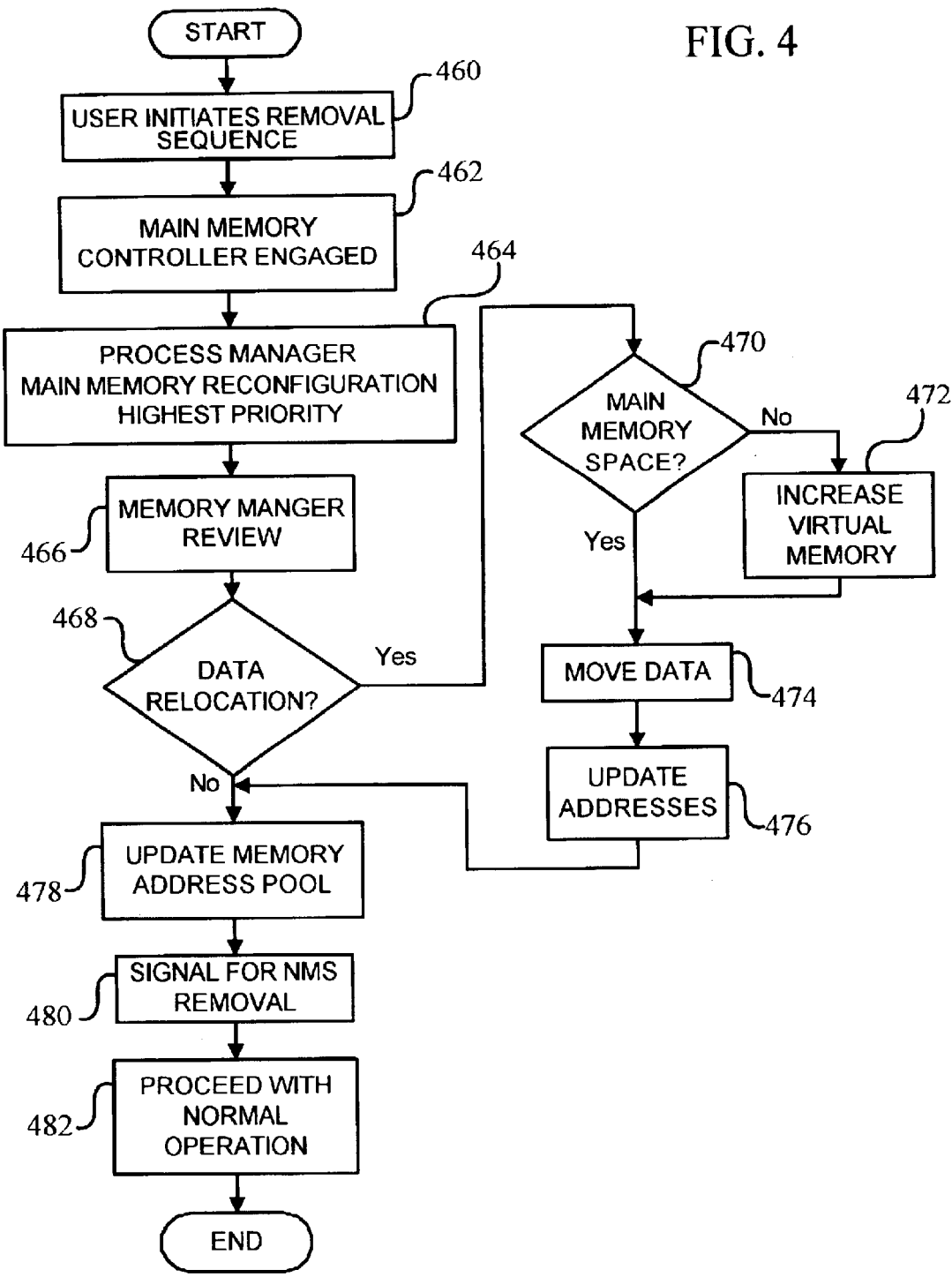
FIG. 4 is a flow diagram illustrating the removal of a non-volatile memory store from main memory according to an embodiment of the present invention.

With respect to FIGS. 2 and 3, in at least one embodiment, insertion 330 of NMS 164 induces memory bus interface 154 and control logic 256 to generate a hardware based IRQ 274 notification to the computer system 100. In at least one embodiment, IRQ 274 is generated at the end of the latency period described above.

More specifically, following the insertion 330 of NMS 164, the initializing setup and configuration of NMS 164 as described above is performed, shown as block 332. IRQ 274 is generated as shown in block 334 to inform the system 100 that NMS 164 is present.

Those skilled in the art will understand and appreciate the IRQ 274 is registered in the BIOS 172 and may be recorded with BIOS flag 276, as shown in block 336. Under appropriate circumstances, IRQ 274 may be registered by the operating system 190 directly, as shown in block 337. The memory ready signal is likewise recognized and registered in BIOS 172.

In at least one embodiment, akin to the connection of a PCMCIA, USB, Firewire or other device attached during live operation and recognized and registered by BIOS 172, insertion of NMS 164 is recorded as a specific event by BIOS 172, with the setting of a BIOS flag 276 and registered to the system. Awareness of NMS 164 and its ready status is recognized by operating system 190 responding to event registered to the system by BIOS 172, and reading the condition of BIOS flag 276, shown in block 338.

In at least one embodiment, IRQ 274 announcement that a NMS 164 has been inserted is registered by the operating system 190 directly, as shown in block 337. Operating system 190 may poll BIOS 172 for further information regarding for example the expected size of NMS 164.

In response to the signal that NMS 164 is present, the main memory controller 230 component of operating system 190 may be engaged, as shown in block 340. Main memory controller 230 may signal the process manager 200 that reconfiguration of main memory 160 is the highest priority event for processing, as shown in block 342, More specifically, process manager 200 is directed to suspend further processing activity on all current processes until such time as reconfiguration of main memory 160, has been completed.

In general, as CPU 150 is capable of performing only one event at any given instant, the process manager 200 assigns a level of priority to each process in current operation. Those skilled in the art will appreciate that although it is desirable to complete the processing requirements of each active application in the shortest time, generally each processing requirement may be interrupted and or reassigned a different order of priority. Based on this convention, the process manager 200 may reassign priorities such that the restructuring of main memory 160 is made the absolute priority.

As has been noted, to be useable, generally main memory 160 resources are divided into standard block sizes by the memory manager 210, such as for example 2 kilobytes. As NMS 164 retains data when removed from computer system 100, in at least one embodiment NMS 164 will retain the standard block sizes originally applied by operating system 190 during the first initialization of NMS 164.

Memory manager 210 may poll NMS 164 to determine if the memory blocks of NMS are compliant with the rest of main memory 160, as shown in decision 344. In the event that the configured block size present in NMS 164 does not match to the current block size utilized by memory manager 210, in at least one embodiment the operating system 190 will generate an error reported to the user. The user may then choose to remove the noncompliant NMS 164 or re-initialize the NMS 164 for the memory block size desired by memory manager 220, as shown in decision 346.

With respect to compliant memory blocks, to be usable in connection with main memory 160 the addresses of NMS 164 memory blocks are added and the available pool of memory addresses are updated, as shown in block 348.

With NMS 164 a recognized component of main memory 160, under the control of memory manager 210, the system will return to normal operation, as shown in block 350.

Removal of NMS 164 is handled similarly. With respect to FIGS. 2 and 4, in at least one embodiment the user signals the operating system 190 of his or her desire to remove NMS 164, thus initiating the removal sequence shown as block 460. Such signal may be in the form of a mouse click over an appropriate GUI object, or by pressing a release button on the device interface 154.

The main memory controller 230 may then be engaged as shown in block 462. Main memory controller 230 may signal the process manager 200 that reconfiguration of main memory 160 is the highest priority event for processing, as shown in block 464. More specifically, process manager 200 is directed to suspend further processing activity on all current processes until such time as reconfiguration of main memory 160, has been completed.

Main memory controller 230 may then interface with memory manger 210 to poll, what, if any, memory blocks within NMS 164 contain data that may be required for continued operation of the system and current applications after removal of NMS 164, as shown in block 466 and decision 468.

If necessary data is identified, it may be copied and or moved prior to removal of NMS 164. For example if it is determined that NMS 164 memory address 28088 contains data relevant to current process now on hold, memory manager 230 may review main memory 160 to determine sufficient space to hold the relevant data, shown in decision 470. If main memory 160 is determined to have insufficient space, virtual memory 158 may be increased as necessary, shown in block 472. Data identified in memory address 28088 may then be moved to memory address 20274 located in main memory 160 or virtual memory 158, as indicated by block 474, and the relevant address updated by memory manager 220, shown in block 476.

The memory addresses of NMS 164 them may be removed as the system memory address pool is updated, shown in block 478. The user may then be given a signal that the NMS 164 may be safely removed, as shown in block 480.

With NMS 164 removed physically, and or logically from computer system 100, the system then proceeds with normal operation as indicated in block 482.

Under appropriate circumstances, such as for example where operating system 190 is held entirely in FMS 162, removal of NMS 164 may occur without re-allocation of memory contents to remaining memory stores. Under such appropriate circumstances, in at least one embodiment, operating system 190 will recognize and terminate any application processes hung by the removal of NMS 164.

As NMS 164 is by definition non-volatile, the insertion of NMS 164 preloaded with an application will provide that application to the operating system 190 and CPU 150 via memory bus 152 in very nearly an "instant on" capacity. Such direct insertion into main memory 160 and connection to memory bus 152 is to be appreciated as orders of magnitude faster than providing an application on CD to CD Rom drive 144, or in any other capacity in which the application it is ultimately provided via the system bus 122.

In addition, as NMS 164 may be added during normal operation of the system, sharing NMS 164 resources across a number of computer systems as needs require can provide a desirable cost savings in the investment of total main memory resources.

Further, as NMS 164 is inserted directly into main memory and connected to memory bus 152 it is to be appreciated as orders of magnitude faster in operation than providing secondary memory such as virtual memory 158 on hard drive 140, or by connecting FLASH memory or other memory device to the system bus 122.

While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

We claim:

1. A computer system comprising:
 a main board;
 at least one central processing unit (CPU) coupled to the main board;
 a main memory, coupled to the at least one CPU by the main board, the main memory capable of receiving at least two memory stores comprising:
  a first memory store (FMS); and
  a removable non-volatile memory store (NMS), the NMS operating with the at least one CPU at the same speed as the FMS;
 the main memory further capable of supporting an operating system loaded into the main memory upon power up of the computer system, the operating system controlling the primary operation of the at least one CPU and main memory, the operating system dynamically adjusting the main memory in response to the removal or insertion of the NMS;

at least one input device, coupled to the CPU; and at least one output device, coupled to the CPU.

2. The computer system of claim 1, wherein the dynamic adjustment is in response to a notification regarding the removal or insertion of the NMS.

3. The computer system of claim 2, wherein the notification is a hardware interrupt response (IRQ), generated by the main board in response to the removal or insertion of the NMS.

4. The computer system of claim 1, further comprising a BIOS memory, coupled to the CPU by the main board, containing BIOS that registers a specific event to the system upon removal or insertion of the NMS.

5. The computer system of claim 4, wherein the NMS further comprises control signals for state and size of the NMS.

6. The computer system of claim 5, wherein the BIOS event is determined from the NMS control signals.

7. The computer system of claim 1, wherein the FMS is volatile RAM.

8. The computer system of claim 1, wherein the FMS is NMS.

9. The computer system of claim 1, wherein the NMS is magnetic random access memory (MRAM).

10. The computer system of claim 1, wherein the NMS is Ferroelectric random access memory (FeRAM).

11. A computer system comprising:

a main board;

at least one central processing unit (CPU) coupled to the main board;

a main memory, coupled to at least one CPU by the main board, comprising:
  a first memory store (FMS);
  a removable non-volatile memory store (NMS), the NMS operating with the at least one CPU at the same speed as the FMS; and
  an operating system loaded into the FMS upon power up of the computer system, the operating system controlling the primary operation of the at least one CPU and main memory, the operating system dynamically adjusting the main memory in response to a notification regarding the removal or insertion of the NMS;

at least one input device, coupled to the at least one CPU; and at least one output device, coupled to the at least one CPU.

12. The computer system of claim 11, wherein the notification is a hardware interrupt response (IRQ), generated by the main board in response to the removal or insertion of the NMS.

13. The computer system of claim 11, further comprising a BIOS memory, coupled to the CPU by the main board, containing BIOS that registers a specific event to the system upon removal or insertion of the NMS.

14. The computer system of claim 13, wherein the NMS further comprises control signals for state and size of the NMS.

15. The computer system of claim 14, wherein the BIOS event is determined from the NMS control signals.

16. The computer system of claim 13, wherein the notification is the specific event registered to the system by the BIOS.

17. The computer system of claim 11, wherein the FMS is volatile RAM.

18. The computer system of claim 11, wherein the FMS is NMS.

19. The computer system of claim 11, wherein the NMS is magnetic random access memory (MRAM).

20. The computer system of claim 11, wherein the NMS is Ferroelectric random access memory (FeRAM).

21. An operating system, executable by a computer having a CPU and memory, comprising:

a process manager for managing access time to the CPU for an active process;

a memory manager for managing memory comprising cache, main memory and virtual memory, for the execution of a currently active process by the CPU;

a device manager for managing the input and output of information required by a process as executed by the CPU; and a main memory controller coupled to the memory manager, for dynamically adjusting use of main memory as non-volatile main memory is added or removed from the computer system during operation.

22. The operating system of claim 21, wherein the dynamic adjustment of use is upon a main memory comprising:

a first memory store (FMS); and a removable non-volatile memory store (NMS), the NMS operating at the same speed as the FMS.

23. The operating system of claim 21, wherein the process may be a thread.

24. The operating system of claim 21, wherein the main memory controller dynamically adjusts use of main memory based upon a hardware interrupt (IRQ) generated by the hardware system.

25. The operating system of claim 21, wherein the main memory controller dynamically adjusts use of main memory based upon a BIOS event registered to the system.

26. The operating system of claim 21, wherein the operations of the main memory controller are given the highest priority by the process manager.

27. The operating system of claim 26, wherein the priority is absolute.

28. The operating system of claim 21, wherein the FMS is volatile RAM.

29. The operating system of claim 21, wherein the FMS is NMS.

30. The operating system of claim 21, wherein the non-volatile main memory is magnetic random access memory (MRAM).

31. The operating system of claim 21, wherein the non-volatile main memory is Ferroelectric random access memory (FeRAM).

32. A method of using an operating system having a process controller, memory manager, device manager, and a main memory controller to dynamically adjust use of a memory address pool when a non-volatile memory store (NMS) is inserted into the main memory store of an operating computer system having a NMS compliant hardware subsystem, comprising:

inserting the NMS into the computer system;

initializing the inserted NMS;

triggering a notification by the hardware subsystem that NMS has been initialized;

recognizing the notification within the operating system;

engaging the main memory controller, the main memory controller informing the process manager that memory reconfiguration is the highest priority;

polling the NMS to confirm a compliant memory structure for use with the main memory address pool; and updating the main memory address pool to include the NMS memory structure.

33. The method of claim 32, wherein the notification is an IRQ event.

34. The method of claim 33, wherein the IRQ event is recorded by a BIOS flag.

35. The method of claim 34, wherein the recognition of the notification by the operating system is by the operating system polling the BIOS flag.

36. The method of claim 32, wherein the dynamic adjustment of use is upon a main memory store comprising:

a first memory store (FMS); and a removable NMS, the NMS operating at the same speed as the FMS.

37. A method of using an operating system having a process controller, memory manager, device manager, and a main memory controller to dynamically adjust use of a memory address pool when a non-volatile memory store (NMS) is removed from the main memory store of an operating computer system having a NMS compliant hardware subsystem, comprising:

signaling the operating system the desire to remove the NMS;

engaging the main memory controller, the main memory controller informing the process manager that memory reconfiguration is the highest priority;

polling the memory manager for identification of NMS addresses tied to necessary memory data;

moving identified necessary data from NMS to remaining memory addresses; and updating the main memory address pool to exclude the NMS memory addresses.

38. The method of claim 37, wherein the notification is an IRQ event.

39. The method of claim 37, further comprising increasing virtual memory to facilitate moving identified necessary data form NMS.

40. The method of claim 37, further comprising including a signal to the user that NMS may be safely removed.

41. The method of claim 37, wherein the dynamic adjustment of use is upon a main memory store comprising:

a first memory store (FMS); and a removable NMS, the NMS operating at the same speed as the FMS.

* * * * *